United States Patent Office — 3,373,207 — Patented Mar. 12, 1968

3,373,207
IONYLIDENETHYL PHOSPHONIUM SALTS AND A PROCESS FOR PREPARING THE SAME
Axel Nuerrenbach, Wilhelm Sarnecki, and Werner Reif, Ludwigshafen (Rhine), Germany, assignors to Badische Anilin- & Soda-Fabrik Aktiengesellschaft, Ludwigshafen (Rhine), Germany
No Drawing. Filed May 19, 1964, Ser. No. 368,685
Claims priority, application Germany, May 24, 1963, B 72,042
The portion of the term of the patent subsequent to Dec. 27, 1983, has been disclaimed
3 Claims. (Cl. 260—606.5)

ABSTRACT OF THE DISCLOSURE

Production of quaternary β-ionylidenethyl phosphonium salts by reacting a carboxylic ester of β-ionylidenethanol with a tertiary phosphine and an acid or with the hydrosalt of a tertiary phosphine in a solvent or diluent at −20° C. to 120° C.

---

This invention relates to a new process for the production of β-ionylidenethyl phosphonium salts in which one of the four ligands of the phosphorus atom is the β-ionylidenethyl radical (I):

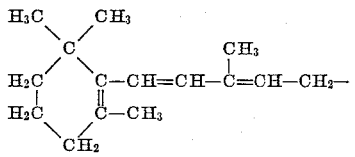

We have found that quaternary β-ionylidenethyl phosphonium salts are obtained in excellent yields by reacting a carboxylic ester of β-ionylidenethanol with a tertiary phosphine and an acid or with the hydrosalt of a tertiary phosphine.

Not only esters of all-trans-β-ionylidenethanol, but also those of cis-β-ionylidenethanol are suitable for the process according to this invention.

Tertiary phosphines having aromatic radicals are particularly suitable as tertiary phosphines, for example tri-p-tolylphosphine, trianisylphosphine and especially triphenylphosphine.

Suitable acids are inorganic and organic acids which form salts with the tertiary phosphines, for example hydrohalic acids, such as hydrochloric acid and hydrobromic acid, oxyacids of sulfur or sulfonic acids, for example sulfuric acid. Of the organic acids, too, the strong acids are particularly suitable, for example p-toluenesulfonic acid. The term hydrosalts denotes salts formed by adding on an anion and the proton to the phosphine. The expression hydrosalt also includes the dissociation products of the hydrosalts formed under the influence of liquids.

Those carboxylic acids which are generally known and easily accessible, for example acetic acid, stearic acid and other aliphatic carboxylic acids, particularly of the fatty acid series, benzoic acid and other aromatic carboxylic acids, are especially recommended as carboxylic acids.

The reaction is advantageously carried out in solvents or diluents, for example in benzene, toluene, diethyl ether, tetrahydrofuran, alcohols and acid derivatives, such as acetonitrile and acetic esters. Polar solvents such as alcohols and acetonitrile are preferred. Mixtures of solvents are also suitable.

When the solvent is rightly chosen, the quaternary phosphonium salt in many cases crystallizes out and may be directly filtered off. The words solvent and diluent are intended to convey that the reaction according to this invention may be carried out not only with dissolved reactants but also with reactants in suspension. The solvents and diluents should be compatible with the reactants under the reaction conditions and should yield a liquid within the range of the reaction temperature. An expert will have no difficulty in choosing solvents and diluents for the purposes of the present invention.

The reaction temperature may be varied within wide limits, from about −20° C. to about +120° C. Depending on the type of solvent and of the β-ionylidenethyl ester, temperatures of from 0° C. to 80° C. are advantageously used. The reaction period depends, inter alia, on the reaction temperature. The β-ionylidenethyl ester and the phosphine or phosphine hydrosalt may be used in any molar ratio. However, it is advantageous to use a slight excess of the phosphine or phosphine hydrosalt so that the β-ionylidenethyl ester, as the more valuable component, is reacted as completely as possible. The end point of the reaction may if desired be determined for example by means of chromatography.

Using the acetate of ionylidenethanol, for example, the reaction according to this invention proceeds according to the following equation:

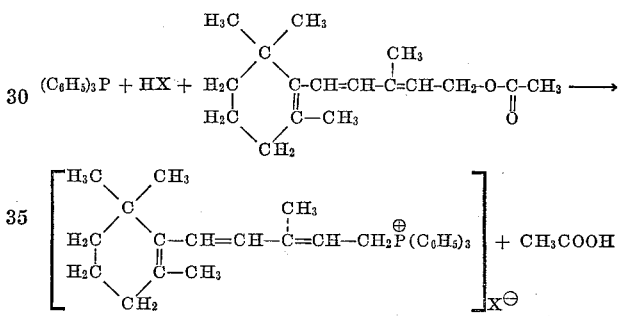

in which X⊖ denotes the equivalent of an anion, for example Cl⊖.

When using a tertiary phosphine and an acid instead of the hydrosalt of the tertiary phosphine it is recommended that the acid should not be brought into contact with the ionylidenethyl ester in the absence of the phosphine so that there should be no risk of a saponification of the ester.

The process according to this invention makes a valuable contribution to the art because it makes possible the preparation of quaternary β-ionylidenethyl phosphonium salts direct in pure form from the esters of β-ionylidenethanol. This is very advantageous because for technical reasons the esters of ionylidenethanol are often prepared instead of the alcohol, for example according to U.S. patent specification No. 2,957,933.

The fact that β-ionylidenethyl esters can be converted direct and without difficulty into the quaternary phosphonium salts is astonishing because according to U.S. patent specification No. 2,905,717, in which the production of quaternary phosphonium salts from phosphonium hydrohalides and alcohols is described, ester groups do not take part in this reaction.

The phosphonium salts are suitable for controlling water snails and are used as intermediates in the synthesis of carotenoids.

Having regard to the reaction product dissolved in the mother liquor, yields are very good.

The invention is further illustrated by the following examples. Parts are by weight, unless otherwise stated. Parts by volume bear the same relation to parts by weight as the liter (S.T.P.) to the kilogram.

Example 1

A mixture of 34 parts of triphenylphosphine hydrobromide, 26 parts of all-trans-β-ionylidenethyl acetate and 150 parts by volume of acetonitrile is stirred for several hours at room temperature. The solvent is then distilled off under subatmospheric pressure at a bath temperature of 40° C. and the residue is washed three times, each time with 100 parts by volume of diethyl ether. 53 parts of β-ionylidenethyltriphenyl phosphonium hydrobromide is obtained after drying.

Phosphorus: calculated 5.68%, found 5.7%.

Extinction of a 1% solution in methanol in a layer 1 cm. in thickness at 276 millimicrons—E (1%, 1 cm., 276 millimicrons)=211.

Example 2

37 parts by volume of a 2.7 N solution of hydrogen chloride in tetrahydrofuran is allowed to flow at room temperature into a mixture of 27 parts of triphenyl phosphine, 26 parts of trans-β-ionylidenethyl acetate and 50 parts by volume of tetrahydrofuran. The mixture is stirred for twenty-five hours at room temperature and then for ten hours at −5° C. 15 parts of (β-ionylidenethyl)-triphenyl phosphonium chloride is precipitated, having the melting point 113° C. to 114° C.

Example 3

A mixture of 27 parts of triphenyl phosphine, 18 parts of p-toluenesulfonic acid, 26 parts of a mixture of 30% of cis- and 70% of trans-β-ionylidenethyl acetate and 100 parts by volume of methanol is stirred for four hours at room temperature. The solvent is then evaporated in a water jet vacuum at a bath temperature of 40° C. The residue is digested three times, each time with 100 parts by volume of ether. The crystalline residue is freed from remainders of ether in vacuo. 61 parts of (β-ionylidenethyl)-triphenyl phosphonium p-toluenesulfonate is obtained.

E (1%, 1 cm., 276 millimicrons)=265.

Example 4

A mixture of 36 parts of triphenylphosphonium hydrogen sulfate, 21 parts of trans-β-ionylidenethyl acetate and 50 parts by volume of ethyl alcohol is stirred for four hours at room temperature and then for four hours at −20° C. The precipitate is filtered off, washed with cold ethyl alcohol and dried. 32 parts of (β-ionylidenethyl)-triphenyl phosphonium hydrogen sulfate is obtained having a melting point of 175° C. to 178° C. with decomposition.

Example 5

8.5 parts by volume of a 12.3 N hydrochloric acid is added to 26 parts of triphenyl phosphine, 46 parts of trans-β-ionylidenethyl palmitate and 200 parts by volume of ethyl alcohol. The mixture is stirred for five hours at room temperature and for one hour at 50° C. The solvent is distilled off in a water jet vacuum and the residue is digested four times, each time with 100 parts by volume of ether. The remainders of ether are removed in vacuo and 43 parts of (β-ionylidenethyl)-triphenyl phosphonium hydrochloride is obtained.

E (1%, 1 cm., 276 millimicrons)=280.

Example 6

A mixture of 36 parts of triphenyl phosphonium hydrogen sulfate, 26 parts of trans-β-ionylidenethyl acetate and 100 parts by volume of ethyl acetate is stirred for five minutes at 80° C. The whole is concentrated under subatmospheric pressure at a bath temperature of 40° C. and then digested four times, each time with 100 parts by volume of ether, to remove the acetic acid formed and the impurities. After the product has been freed from remainders of ether in vacuo, 55 parts of (β-ionylidenethyl)-triphenyl phosphonium hydrogen sulfate is obtained.

E (1%, 1 cm., 276 millimicrons)=305.

We claim:
1. The process for the production of quaternary β-ionylidenethyl phosphonium salts which comprises allowing a triarylphosphine and a strong acid at a temperature in the range between −20° C. and 120° C. in liquid medium to act upon a carboxylic ester of β-ionylidenethyl alcohol.

2. The process according to claim 1 wherein the triarylphosphine and the acid are present as the hydrosalt of the triarylphosphine.

3. The process according to claim 1 when carried out in the presence of an organic liquid as the reaction medium.

References Cited
UNITED STATES PATENTS 3,294,844   12/1966   Sarnecki et al. _____ 260—606.5

TOBIAS E. LEVOW, Primary Examiner.

HELEN M. McCARTHY, Examiner.

W. F. W. BELLAMY, Assistant Examiner.